United States Patent
Gillett et al.

(10) Patent No.: US 10,040,542 B1
(45) Date of Patent: Aug. 7, 2018

(54) SYSTEM AND METHOD FOR STABILIZING LONGITUDINAL ACCELERATION OF A ROTORCRAFT

(71) Applicant: Bell Helicopter Textron Inc., Fort Worth, TX (US)

(72) Inventors: Luke Gillett, Grapevine, TX (US); Sung K. Kim, Bedford, TX (US)

(73) Assignee: BELL HELICOPTER TEXTRON INC., Fort Worth, TX (US)

(*) Notice: Subject to any disclaimer, the term of this patent is extended or adjusted under 35 U.S.C. 154(b) by 0 days.

(21) Appl. No.: 15/426,560

(22) Filed: Feb. 7, 2017

(51) Int. Cl.
| | |
|---|---|
| B64C 27/00 | (2006.01) |
| B64C 27/04 | (2006.01) |
| B64C 13/50 | (2006.01) |
| B64C 27/06 | (2006.01) |
| B64C 27/82 | (2006.01) |
| G05D 1/02 | (2006.01) |
| G05D 1/00 | (2006.01) |
| G05D 1/08 | (2006.01) |

(52) U.S. Cl.
CPC ........... *B64C 13/503* (2013.01); *B64C 27/06* (2013.01); *B64C 27/82* (2013.01); *G05D 1/0061* (2013.01); *G05D 1/0077* (2013.01); *G05D 1/0202* (2013.01); *G05D 1/0816* (2013.01)

(58) Field of Classification Search
CPC ....... B64C 13/503; B64C 27/06; B64C 27/82; G05D 1/0061; G05D 1/0077; G05D 1/0202; G05D 1/0816
USPC ..... 701/3, 4, 507, 7, 8; 244/182, 181, 17.13, 244/191
See application file for complete search history.

(56) References Cited

U.S. PATENT DOCUMENTS

| | | |
|---|---|---|
| 4,029,271 A | 6/1977 | Murphy et al. |
| 6,259,975 B1 | 7/2001 | Rollet et al. |
| 2008/0237392 A1 | 10/2008 | Piasecki et al. |
| 2008/0308682 A1* | 12/2008 | Builta .................. B64D 31/08 244/182 |

FOREIGN PATENT DOCUMENTS

EP           0455580 A2     5/1991

* cited by examiner

*Primary Examiner* — Marthe Y Marc-Coleman
(74) *Attorney, Agent, or Firm* — Slater Matsil, LLP

(57) ABSTRACT

In accordance with an embodiment of the present invention, a method of operating a rotorcraft includes operating the rotorcraft in a speed control mode, where a speed of the rotorcraft is proportional to a pilot control command; detecting a high longitudinal acceleration condition; upon detection of the high longitudinal acceleration condition, temporarily disabling the speed control mode and stabilizing the rotorcraft while the speed control mode is disabled; and reestablishing the speed control mode when a measured longitudinal acceleration of the rotorcraft falls below a first threshold.

19 Claims, 5 Drawing Sheets

SYSTEM AND METHOD FOR STABILIZING LONGITUDINAL ACCELERATION OF A ROTORCRAFT

TECHNICAL FIELD

The present invention relates generally to a system and method for a flight control, and, in particular embodiments, to a system and method for stabilizing longitudinal acceleration of a rotorcraft.

BACKGROUND

Fly-by-wire systems in aircraft, as opposed to mechanically controlled systems, use electronic signals to control the flight surfaces and engines in the aircraft. For example, instead of having the pilot controls mechanically linked to the control surfaces via a hydraulic system, the pilot controls are electronically linked to a flight computer, which, in turn, controls flight surface actuators via electronic signals. By further interfacing the flight computer to aircraft sensors, sophisticated control algorithms may be used to provide autopilot functionality, as well as to stabilize and control the aircraft.

While fly-by-wire systems have become commonplace in commercial and civilian fixed wing aircraft, their adoption among rotorcraft, such as helicopters, has been much slower due, in part, to the increased complexity of controlling and stabilizing a rotorcraft. However, by adopting fly-by-wire systems in helicopters, safer operation may be achieved in difficult flight environments such as low speed, low altitude, degraded visual environments and inclement weather. Another area in which fly-by-wire systems may benefit rotorcraft is in the reduction in pilot workload. By providing automated features such as stabilization in response to wind, control axis decoupling, position hold and heading hold functionality, the pilot is freed up to focus on the environment in which he flies.

One challenge in the design of fly-by-wire systems for rotorcraft is maintaining control of the rotorcraft during sudden changes in the acceleration of the rotorcraft caused by wind gusts or by sudden pilot control settings. For example, in circumstances when the flight computers control the speed of the rotorcraft, sudden changes in acceleration of the rotorcraft may cause instability when the speed control loop has high loop gains, or may cause speed errors when the speed control loop has lower loop gains.

SUMMARY

In accordance with an embodiment of the present invention, a method of operating a rotorcraft includes operating the rotorcraft in a speed control mode, where a speed of the rotorcraft is proportional to a pilot control command; detecting a high longitudinal acceleration condition; upon detection of the high longitudinal acceleration condition, temporarily disabling the speed control mode and stabilizing the rotorcraft while the speed control mode is disabled; and reestablishing the speed control mode when a measured longitudinal acceleration of the rotorcraft falls below a first threshold.

BRIEF DESCRIPTION OF THE DRAWINGS

For a more complete understanding of the present invention, and the advantages thereof, reference is now made to the following descriptions taken in conjunction with the accompanying drawings, in which.

Figure 1:
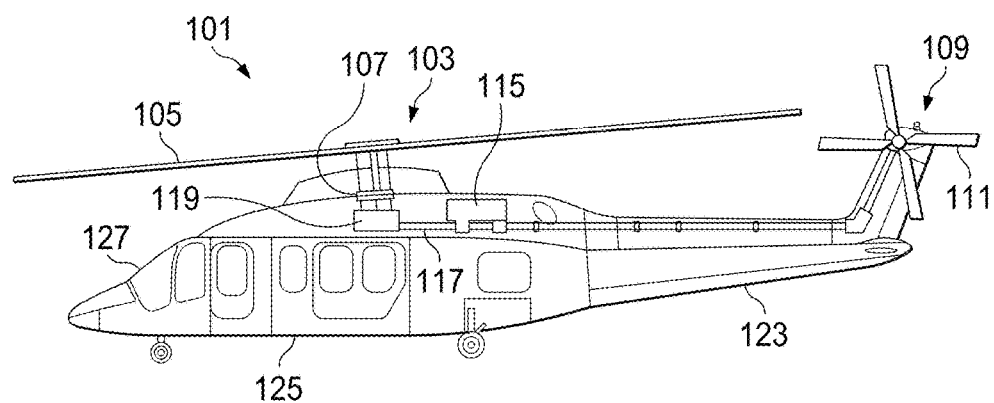
FIG. 1 illustrates an embodiment rotorcraft.

Corresponding numerals and symbols in different figures generally refer to corresponding parts unless otherwise indicated. The figures are drawn to clearly illustrate the relevant aspects of the embodiments and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

Illustrative embodiments of the system and method of the present disclosure are described below. In the interest of clarity, all features of an actual implementation may not be described in this specification. It will of course be appreciated that in the development of any such actual embodiment, numerous implementation-specific decisions may be made to achieve the developer's specific goals, such as compliance with system-related and business-related constraints, which will vary from one implementation to another. Moreover, it should be appreciated that such a development effort might be complex and time-consuming but would nevertheless be a routine undertaking for those of ordinary skill in the art having the benefit of this disclosure.

Reference may be made herein to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The increasing use of rotorcraft, in particular, for commercial and industrial applications, has led to the development of larger more complex rotorcraft. However, as rotorcraft become larger and more complex, the differences between flying rotorcraft and fixed wing aircraft has become more pronounced. Since rotorcraft use one or more main rotors to simultaneously provide lift, control attitude, control altitude, and provide lateral or positional movement, different flight parameters and controls are tightly coupled to each other, as the aerodynamic characteristics of the main rotors affect each control and movement axis. For example, the flight characteristics of a rotorcraft at cruising speed or high speed may be significantly different than the flight characteristics at hover or at relatively low speeds. Additionally, different flight control inputs for different axes on the main rotor, such as cyclic inputs or collective inputs, affect other flight controls or flight characteristics of the rotorcraft. For example, pitching the nose of a rotorcraft forward to increase forward speed will generally cause the rotorcraft to lose altitude. In such a situation, the collective may be increased to maintain level flight, but the increase in collective causes increased power to the main rotor which, in turn, requires additional anti-torque force from the tail rotor. This is in contrast to fixed wing systems where the control inputs are less closely tied to each other and flight characteristics in different speed regimes are more closely related to each other.

Recently, fly-by-wire (FBW) systems have been introduced in rotorcraft to assist pilots in stably flying the rotorcraft and to reduce workload on the pilots. The FBW system may provide different control characteristics or responses for cyclic, pedal or collective control input in the different flight regimes, and may provide stability assistance or enhancement by decoupling physical flight characteristics so that a pilot is relieved from needing to compensate for some flight commands issued to the rotorcraft. FBW systems may be implemented in one or more flight control computers (FCCs) disposed between the pilot controls and flight control systems, providing corrections to flight controls that assist in operating the rotorcraft more efficiently or that put the rotorcraft into a stable flight mode while still allowing the pilot to override the FBW control inputs. The FBW systems in a rotorcraft may, for example, automatically adjust power output by the engine to match a collective control input, apply collective or power correction during a cyclic control input, provide automation of one or more flight control procedures, provide for default or suggested control positioning, or the like.

FBW systems for rotorcraft must provide stable flight characteristics for FBW controlled flight parameters while permitting the pilot to override or adjust any suggested flight parameters suggested by the FBW system. Additionally, in providing enhanced control and automated functionality for rotorcraft flight, the FBW system must maintain an intuitive and easy to use flight control system for the pilot. Thus, the FBW system adjusts the pilot flight controls so that the controls are in a position associated with the relevant flight parameter. For example, the FBW system may adjust the collective stick to provide suggested or FBW controlled flight parameters, and which reflect a collective or power setting. Thus, when the pilot releases the collective stick and the FBW system provides collective control commands, the collective stick is positioned intuitively in relation to the actual power or collective setting so that, when the pilot grasps the collective stick to retake control, the control stick is positioned where the pilot expects the stick to be positioned for the actual collective setting of the main rotor. Similarly, the FBW system use the cyclic stick to, for example, adjust for turbulence, drift or other disturbance to the flight path, and may move the cyclic stick as the FBW system compensates the cyclic control. Thus, when the pilot grasps the cyclic stick to take control of flight from the FBW system, the cyclic stick is positioned to reflect the actual cyclic settings.

Embodiments of the present disclosure will be described with respect to embodiments in a specific context, namely a system and method for stabilizing the longitudinal acceleration in a rotorcraft. Embodiments of the present disclosure may also be applied to other control mode transitions in the operation and control of a rotorcraft.

In an embodiment fly-by-wire control system for a rotorcraft, conditions that cause or could potentially cause a sudden acceleration of the rotorcraft are monitored while the rotorcraft is in a speed control mode. During such speed control modes, the flight control system controls the pitch attitude of the rotorcraft to achieve the desired speed. When there is a large change of acceleration, which is often associated with extreme pitch attitude angles, stabilizing the pitch of the rotorcraft while maintaining a high loop gain in the speed control loop becomes difficult. Depending on the loop gain of the speed control loop, sudden changes in acceleration may lead to instability of the rotorcraft or loss of speed control accuracy.

In an embodiment of the present invention, the speed control loop is temporarily disabled upon detection of a high acceleration condition, and the pitch attitude of the rotorcraft is stabilized while the speed control loop is temporarily disabled. Once the acceleration of the rotorcraft decreases below a specified acceleration threshold, the speed control loop is re-enabled.

FIG. 1 illustrates a rotorcraft 101 according to some embodiments. The rotorcraft 101 has a main rotor system 103, which includes a plurality of main rotor blades 105. The pitch of each main rotor blade 105 may be controlled by a swashplate 107 in order to selectively control the attitude, altitude and movement of the rotorcraft 101. The swashplate 107 may be used to collectively and/or cyclically change the pitch of the main rotor blades 105. The rotorcraft 101 also has an anti-torque system, which may include a tail rotor 109, no-tail-rotor (NOTAR), or dual main rotor system. In rotorcraft with a tail rotor 109, the pitch of each tail rotor blade 111 is collectively changed in order to vary thrust of the anti-torque system, providing directional control of the rotorcraft 101. The pitch of the tail rotor blades 111 is changed by one or more tail rotor actuators. In some embodiments, the FBW system sends electrical signals to the tail rotor actuators or main rotor actuators to control flight of the rotorcraft.

Power is supplied to the main rotor system 103 and the anti-torque system by engines 115. There may be one or more engines 115, which may be controlled according to signals from the FBW system. The output of the engine 115 is provided to a driveshaft 117, which is mechanically and operatively coupled to the rotor system 103 and the anti-torque system through a main rotor transmission 119 and a tail rotor transmission, respectively.

The rotorcraft 101 further includes a fuselage 125 and tail section 123. The tail section 123 may have other flight control devices such as horizontal or vertical stabilizers, rudder, elevators, or other control or stabilizing surfaces that are used to control or stabilize flight of the rotorcraft 101. The fuselage 125 includes a cockpit 127, which includes displays, controls, and instruments. It should be appreciated that even though rotorcraft 101 is depicted as having certain illustrated features, the rotorcraft 101 may have a variety of implementation-specific configurations. For instance, in some embodiments, cockpit 127 is configured to accommodate a pilot or a pilot and co-pilot, as illustrated. It is also contemplated, however, that rotorcraft 101 may be operated remotely, in which case cockpit 127 could be configured as a fully functioning cockpit to accommodate a pilot (and possibly a co-pilot as well) to provide for greater flexibility of use, or could be configured with a cockpit having limited functionality (e.g., a cockpit with accommodations for only one person who would function as the pilot operating perhaps with a remote co-pilot or who would function as a co-pilot or back-up pilot with the primary piloting functions being performed remotely). In yet other contemplated embodiments, rotorcraft 101 could be configured as an unmanned vehicle, in which case cockpit 127 could be eliminated entirely in order to save space and cost.

Figure 2:
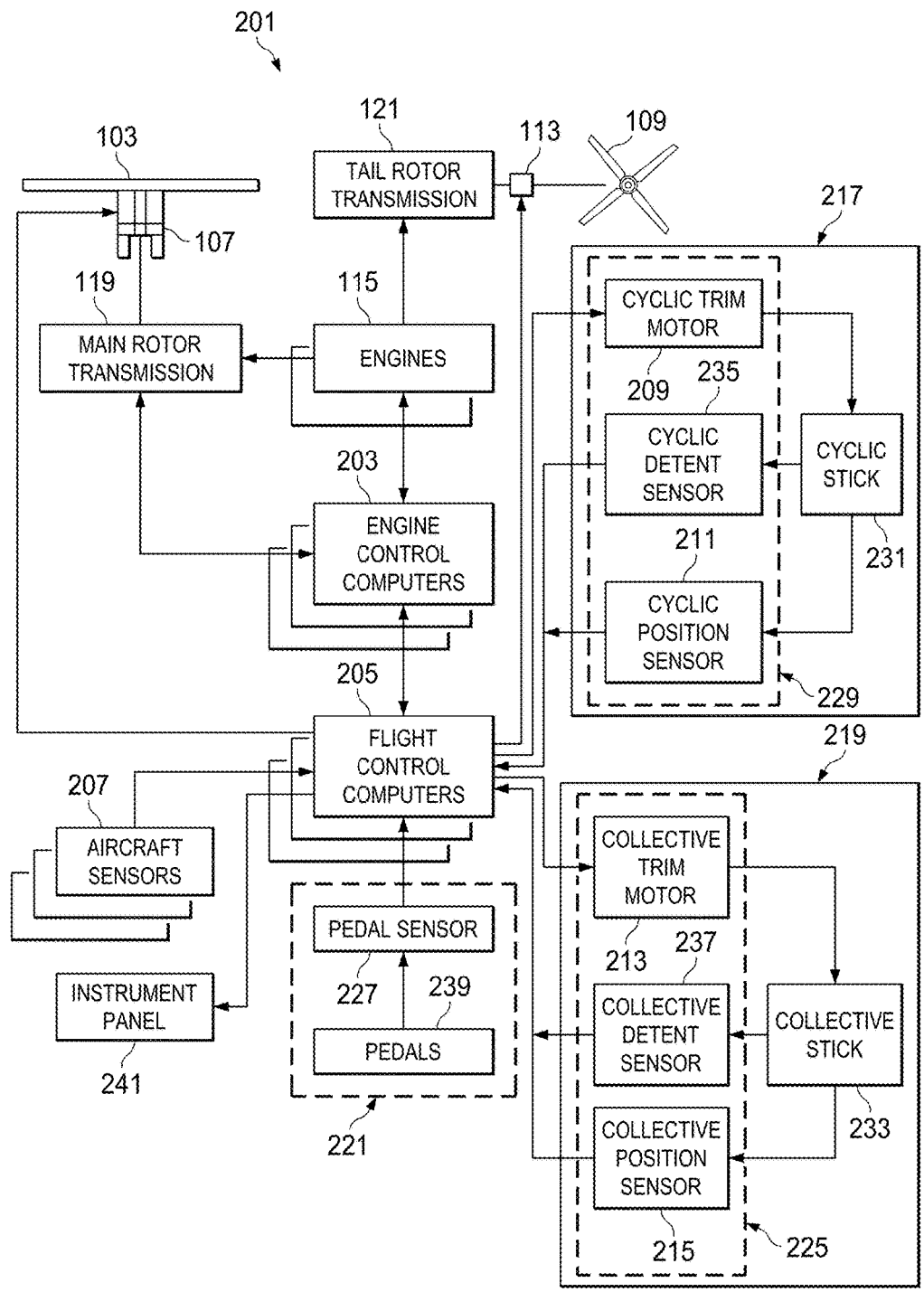
FIG. 2 illustrates a block diagram of an embodiment rotorcraft flight control system.

FIG. 2 illustrates a fly-by-wire flight control system 201 for a rotorcraft according to some embodiments. A pilot may manipulate one or more pilot flight controls in order to control flight of the rotorcraft. The pilot flight controls may include manual controls such as a cyclic stick 231 in a cyclic control assembly 217, a collective stick 233 in a collective control assembly 219, and pedals 239 in a pedal assembly 221. Inputs provided by the pilot to the pilot flight controls may be transmitted mechanically and/or electronically (e.g., via the FBW flight control system) to flight control devices by the flight control system 201. Flight control devices may represent devices operable to change the flight characteristics of the rotorcraft. Flight control devices on the rotorcraft may include mechanical and/or electrical systems operable to change the positions or angle of attack of the main rotor blades 105 and the tail rotor blades 111 or to change the power output of the engines 115, as examples. Flight control devices include systems such as the swashplate 107, tail rotor actuator 113, and systems operable to control the engines 115. The flight control system 201 may adjust the flight control devices independently of the flight crew in order to stabilize the rotorcraft, reduce workload of the flight crew, and the like. The flight control system 201 includes engine control computers (ECCUs) 203, flight control computers 205, and aircraft sensors 207, which collectively adjust the flight control devices.

The flight control system 201 has one or more flight control computers 205 (FCCs). In some embodiments, multiple FCCs 205 are provided for redundancy. One or more modules within the FCCs 205 may be partially or wholly embodied as software and/or hardware for performing any functionality described herein. In embodiments where the flight control system 201 is a FBW flight control system, the FCCs 205 may analyze pilot inputs and dispatch corresponding commands to the ECCUs 203, the tail rotor actuator 113, and/or actuators for the swashplate 107. Further, the FCCs 205 are configured and receive input commands from the pilot controls through sensors associated with each of the pilot flight controls. The input commands are received by measuring the positions of the pilot controls. The FCCs 205 also control tactile cueing commands to the pilot controls or display information in instruments on, for example, an instrument panel 241.

The ECCUs 203 control the engines 115. For example, the ECCUs 203 may vary the output power of the engines 115 to control the rotational speed of the main rotor blades or the tail rotor blades. The ECCUs 203 may control the output power of the engines 115 according to commands from the FCCs 205, or may do so based on feedback such a measured revolutions per minute (RPM) of the main rotor blades.

The aircraft sensors 207 are in communication with the FCCs 205. The aircraft sensors 207 may include sensors for measuring a variety of rotorcraft systems, flight parameters, environmental conditions and the like. For example, the aircraft sensors 207 may include sensors for measuring airspeed, altitude, attitude, position, orientation, temperature, airspeed, vertical speed, and the like. Other sensors 207 could include sensors relying upon data or signals originating external to the rotorcraft, such as a global positioning system (GPS) sensor, a VHF Omnidirectional Range sensor, Instrument Landing System (ILS), and the like.

The cyclic control assembly 217 is connected to a cyclic trim assembly 229 having one or more cyclic position sensors 211, one or more cyclic detent sensors 235, and one or more cyclic actuators or cyclic trim motors 209. The cyclic position sensors 211 measure the position of the cyclic control stick 231. In some embodiments, the cyclic control stick 231 is a single control stick that moves along two axes and permits a pilot to control pitch, which is the vertical angle of the nose of the rotorcraft and roll, which is the side-to-side angle of the rotorcraft. In some embodiments, the cyclic control assembly 217 has separate cyclic position sensors 211 that measuring roll and pitch separately. The cyclic position sensors 211 for detecting roll and pitch generate roll and pitch signals, respectively, (sometimes referred to as cyclic longitude and cyclic latitude signals, respectively) which are sent to the FCCs 205, which controls the swashplate 107, engines 115, tail rotor 109 or related flight control devices.

The cyclic trim motors 209 are connected to the FCCs 205, and receive signals from the FCCs 205 to move the cyclic control stick 231. In some embodiments, the FCCs 205 determine a suggested cyclic stick position for the cyclic stick 231 according to one or more of the collective stick position, the pedal position, the speed, altitude and attitude of the rotorcraft, the engine revolutions per minute (RPM), engine temperature, main rotor RPM, engine torque or other rotorcraft system conditions or flight conditions. The suggested cyclic stick position is a position determined by the FCCs 205 to give a desired cyclic action. In some embodiments, the FCCs 205 send a suggested cyclic stick position signal indicating the suggested cyclic stick position to the cyclic trim motors 209. While the FCCs 205 may command the cyclic trim motors 209 to move the cyclic stick 231 to a particular position (which would in turn drive actuators associated with swashplate 107 accordingly), the cyclic position sensors 211 detect the actual position of the cyclic stick 231 that is set by the cyclic trim motors 206 or input by the pilot, allowing the pilot to override the suggested cyclic stick position. The cyclic trim motor 209 is connected to the cyclic stick 231 so that the pilot may move the cyclic stick 231 while the trim motor is driving the cyclic stick 231 to override the suggested cyclic stick position. Thus, in some embodiments, the FCCs 205 receive a signal from the cyclic position sensors 211 indicating the actual cyclic stick position, and do not rely on the suggested cyclic stick position to command the swashplate 107.

Similar to the cyclic control assembly 217, the collective control assembly 219 is connected to a collective trim assembly 225 having one or more collective position sensors 215, one or more collective detent sensors 237, and one or more collective actuators or collective trim motors 213. The collective position sensors 215 measure the position of a collective control stick 233 in the collective control assembly 219. In some embodiments, the collective control stick 233 is a single control stick that moves along a single axis or with a lever type action. A collective position sensor 215 detects the position of the collective control stick 233 and sends a collective position signal to the FCCs 205, which controls engines 115, swashplate actuators, or related flight control devices according to the collective position signal to control the vertical movement of the rotorcraft. In some embodiments, the FCCs 205 may send a power command signal to the ECCUs 203 and a collective command signal to the main rotor or swashplate actuators so that the angle of attack of the main blades is raised or lowered collectively, and the engine power is set to provide the needed power to keep the main rotor RPM substantially constant.

The collective trim motor 213 is connected to the FCCs 205, and receives signals from the FCCs 205 to move the collective control stick 233. Similar to the determination of the suggested cyclic stick position, in some embodiments, the FCCs 205 determine a suggested collective stick position for the collective control stick 233 according to one or more of the cyclic stick position, the pedal position, the speed, altitude and attitude of the rotorcraft, the engine RPM, engine temperature, main rotor RPM, engine torque or other rotorcraft system conditions or flight conditions. The FCCs 205 generate the suggested collective stick position and send a corresponding suggested collective stick signal to the collective trim motors 213 to move the collective stick 233 to a particular position. The collective position sensors 215 detect the actual position of the collective stick 233 that is set by the collective trim motor 213 or input by the pilot, allowing the pilot to override the suggested collective stick position.

The pedal control assembly 221 has one or more pedal sensors 227 that measure the position of pedals or other input elements in the pedal control assembly 221. In some embodiments, the pedal control assembly 221 is free of a trim motor or actuator, and may have a mechanical return element that centers the pedals when the pilot releases the pedals. In other embodiments, the pedal control assembly 221 has one or more trim motors that drive the pedal to a suggested pedal position according to a signal from the FCCs 205. The pedal sensor 227 detects the position of the pedals 239 and sends a pedal position signal to the FCCs 205, which controls the tail rotor 109 to cause the rotorcraft to yaw or rotate around a vertical axis.

The cyclic and collective trim motors 209 and 213 may drive the cyclic stick 231 and collective stick 233, respectively, to suggested positions. The cyclic and collective trim motors 209 and 213 may drive the cyclic stick 231 and collective stick 233, respectively, to suggested positions, but this movement capability may also be used to provide tactile cueing to a pilot. The trim motors 209 and 213 may push the respective stick in a particular direction when the pilot is moving the stick to indicate a particular condition. Since the FBW system mechanically disconnects the stick from one or more flight control devices, a pilot may not feel a hard stop, vibration, or other tactile cue that would be inherent in a stick that is mechanically connected to a flight control assembly. In some embodiments, the FCCs 205 may cause the trim motors 209 and 213 to push against a pilot command so that the pilot feels a resistive force, or may command one or more friction devices to provide friction that is felt when the pilot moves the stick. Thus, the FCCs 205 control the feel of a stick by providing pressure and/or friction on the stick.

Additionally, the cyclic control assembly 217, collective control assembly 219 and/or pedal control assembly 221 may each have one or more detent sensors that determine whether the pilot is handling a particular control device. For example, the cyclic control assembly 217 may have a cyclic detent sensor 235 that determines that the pilot is holding the cyclic stick 231, while the collective control assembly 219 has a collective detent sensor 237 that determines whether the pilot is holding the collective stick 233. These detent sensors 235, 237 detect motion and/or position of the respective control stick that is caused by pilot input, as opposed to motion and/or position caused by commands from the FCCs 205, rotorcraft vibration, and the like and provide feedback signals indicative of such to the FCCs. When the FCCs 205 detect that a pilot has control of, or is manipulating, a particular control, the FCCs 205 may determine that stick to be out-of-detent (OOD). Likewise, the FCCs may determine that the stick is in-detent (ID) when the signals from the detent sensors indicate to the FCCs 205 that the pilot has released a particular stick. The FCCs 205 may provide different default control or automated commands to one or more flight systems based on the detent status of a particular stick or pilot control.

Figure 3:
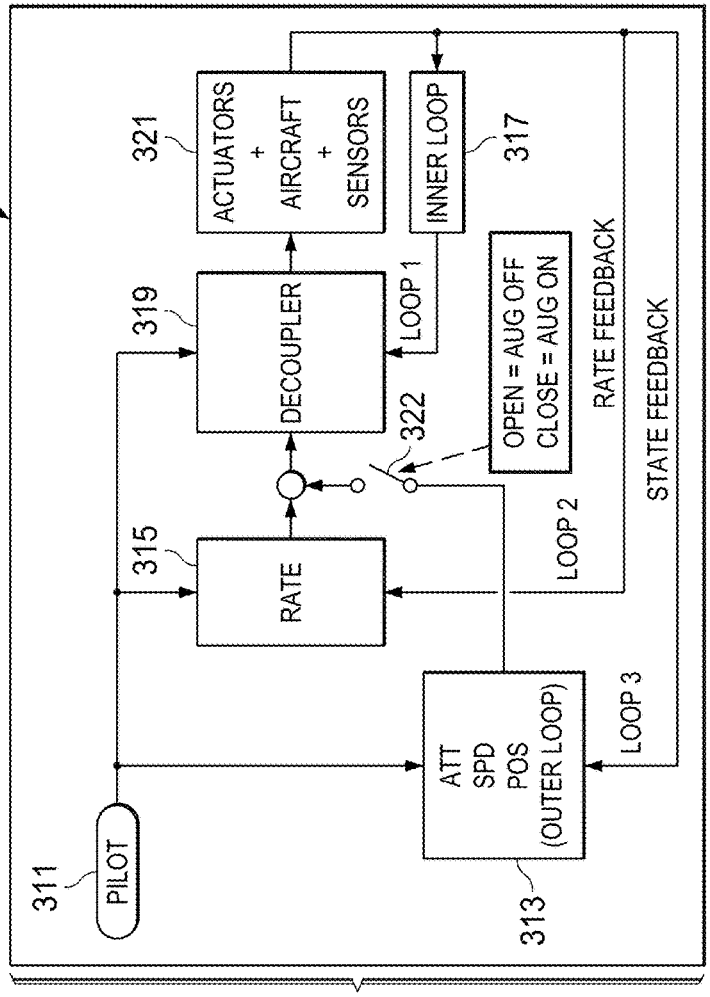
FIG. 3 illustrates a block diagram of an embodiment flight control system.
Figure 3:
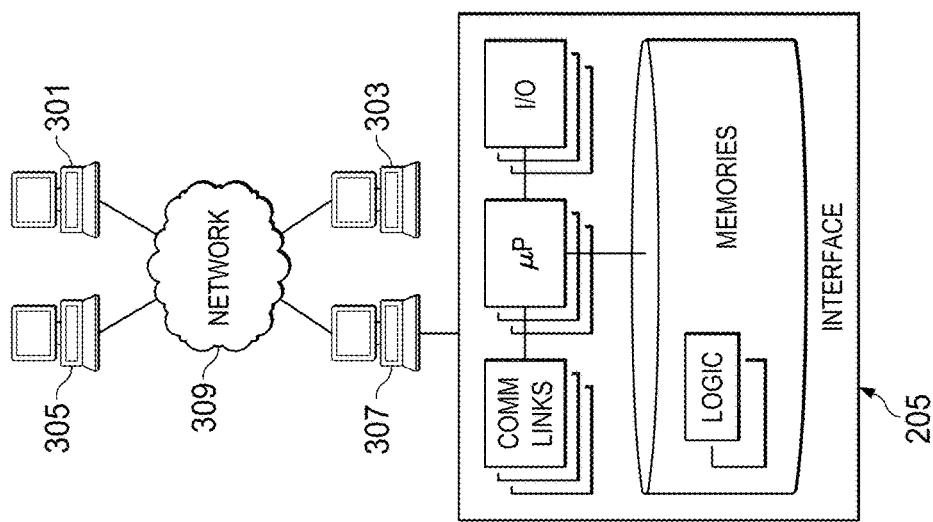

Moving now to the operational aspects of flight control system 201, FIG. 3 illustrates in a highly schematic fashion, a manner in which flight control system 201 may implement FBW functions as a series of inter-related feedback loops running certain control laws. FIG. 3 representatively illustrates a three-loop flight control system 201 according to an embodiment. In some embodiments, elements of the three-loop flight control system 201 may be implemented at least partially by FCCs 205. As shown in FIG. 3, however, all, some, or none of the components (301, 303, 305, 307) of three-loop flight control system 201 could be located external or remote from the rotorcraft 100 and communicate to on-board devices through a network connection 309.

The three-loop flight control system 201 of FIG. 3 has a pilot input 311, an outer loop 313, a rate (middle) loop 315, an inner robust loop 317, a decoupler 319, and aircraft equipment 321 (corresponding, e.g., to flight control devices such as swashplate 107, tail rotor transmission 212, etc., to actuators (not shown) driving the flight control devices, to sensors such as aircraft sensors 207, position sensors 211, 215, detent sensors 235, 237, etc., and the like).

In the example of FIG. 3, a three-loop design separates the inner stabilization and rate feedback loops from outer guidance and tracking loops. The control law structure primarily assigns the overall stabilization task and related tasks of reducing pilot workload to inner robust loop 317. Next, middle loop 315 provides rate augmentation. Outer loop 313 focuses on guidance and tracking tasks. Since inner robust loop 317 and rate loop 315 provide most of the stabilization, less control effort is required at the outer loop level. As representatively illustrated in FIG. 3, a switch 322 may be provided to turn outer loop flight augmentation on and off, as the tasks of outer loop 313 are not necessary for flight stabilization.

In some embodiments, the inner robust loop 317 and rate loop 315 include a set of gains and filters applied to roll/pitch/yaw 3-axis rate gyro and acceleration feedback sensors. Both the inner robust loop 317 and rate loop 315 may stay active, independent of various outer loop hold modes. Outer loop 313 may include cascaded layers of loops, including an attitude loop, a speed loop, a position loop, a vertical speed loop, an altitude loop, and a heading loop. In accordance with some embodiments, the control laws running in the illustrated the loops allow for decoupling of otherwise coupled flight characteristics, which in turn may provide for more stable flight characteristics and reduced pilot workload. Furthermore, the outer loop 313 may allow for automated or semi-automated operation of certain high-level tasks or flight patterns, thus further relieving the pilot workload and allowing the pilot to focus on other matters including observation of the surrounding terrain.

Figure 4:
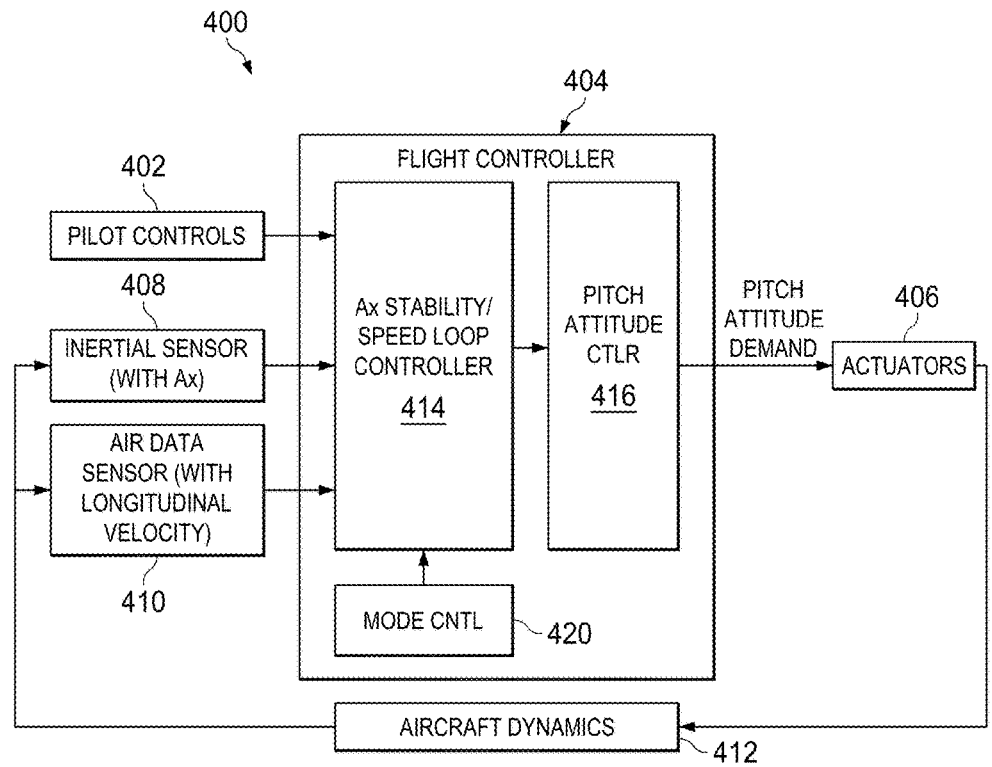
FIG. 4 illustrates a block diagram of a further embodiment flight control system.

FIG. 4 illustrates a flight control system 400 according to an embodiment of the present invention. Pilot controls 402 represents, for example, the cyclic control assembly 217 of the rotorcraft described above in FIG. 2. As shown, pilot controls 402 interface to flight controller 404. In various embodiments, flight controller 404 is implemented using a flight computer, such as FCC 205 or other processing hardware. Flight controller 404 also interfaces with and controls aircraft actuators 406 representing the various actuators of the rotorcraft, which, in turn, control the physical body of the rotorcraft, represented by aircraft dynamics block 412. Various sensors on board the rotorcraft, including inertial sensor 408 and air data sensor 410, provide sensor input to the flight controller 404. Inertial sensor 408 may be implemented using, for example, a gyroscope to measure acceleration. Air data sensor 410 is configured to determine the forward velocity of the rotorcraft by measuring air speed relative to the surrounding air mass. In alternative embodiments of the present invention other types of sensor and systems may be used to determine acceleration and velocity.

In various embodiments, flight controller 404 controls the rotorcraft using three loops: an inner robust loop, a rate feedback loop and an outer loop: the inner robust loop stabilizes the dynamics of the rotorcraft, the rate loop controls the angular rates of the rotor craft, and the outer loop provides control signals to the inner robust loop and/or rate loops to affect a desired attitude, speed and position of the rotorcraft. In some embodiments, the outer loop supports and provides flight augmentation or auto-pilot functionality and may be manually or automatically disabled based on flight and system conditions. The inner robust loop and rate feedback loops, on the other hand, remain operational to provide stability to the rotorcraft.

For purposes of illustration, flight controller 404 is illustrated with respect to the control blocks that affect the pitch attitude of a rotorcraft with respect to embodiment speed control and longitudinal acceleration stabilization methods. These control blocks include, for example, an embodiment longitudinal acceleration (Ax) stability/speed loop controller 414 and a pitch attitude controller 416. It should be understood that flight controller 404 may also include other controllers and control paths that affect the roll and yaw and other states of the rotorcraft in addition to the pitch rate, which may be implemented using flight control systems and methods, as well as flight control algorithms known in the aft.

When the rotorcraft is in a speed control mode, longitudinal acceleration (Ax) stability/speed loop controller 414 provides a pitch attitude command to pitch attitude controller 416 based on a desired speed indicated by pilot controls 402 and based on a velocity of the rotorcraft sensed by air data sensor 410. Pitch attitude controller, in conjunction with other control algorithms provides a pitch command to actuators 406 that may include, for example, swashplate 107 to control the pitch of the rotorcraft. In a high longitudinal acceleration condition, the longitudinal acceleration (Ax) stability/speed loop controller 414 temporarily disables the speed control function and reduces the acceleration of the rotorcraft. Such a high longitudinal acceleration condition may be detected, for example, by inertial sensor 408. In an embodiment, the acceleration of the rotorcraft is reduced by integrating the longitudinal acceleration (Ax) sensed by inertial sensor 408 and providing the integrated acceleration to pitch attitude controller 416. The determination of the mode in which longitudinal acceleration (Ax) stability/speed loop controller 414 operates may be made, for example, by mode controller 420.

Figure 5:
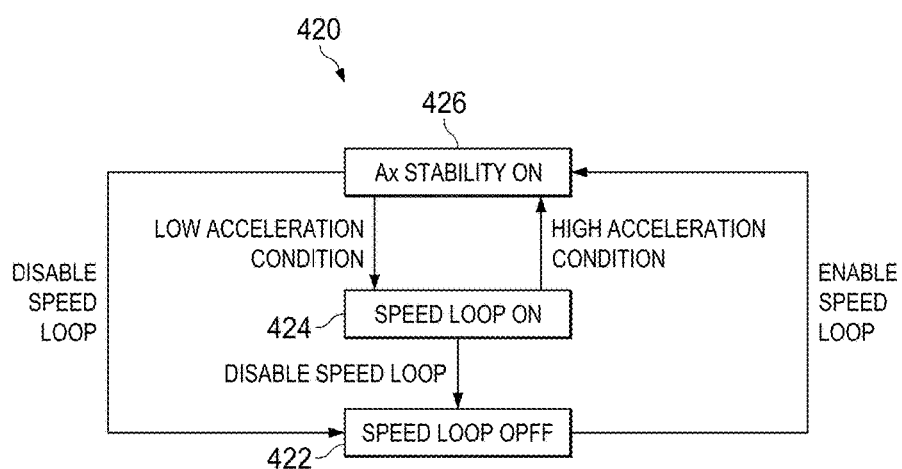
FIG. 5 illustrates an embodiment state diagram for controlling the modes of the embodiment flight control system.

FIG. 5 illustrates a state machine diagram of mode controller 420 with respect to the mode selection of longitudinal acceleration (Ax) stability/speed loop controller 414. As shown, operation may start in state 422 in which the speed control loop is off. In one example, when the speed loop is off, cyclic stick 231 provides a pitch rate command proportional to its physical offset. When the speed loop is enabled, for example, by manually selecting a speed control mode or by having the speed control mode automatically selected by flight controller 404 in response to other conditions, the pitch attitude of the rotorcraft is controlled according to a speed command in state 424 subject to the longitudinal acceleration (Ax) conditions that allow the state machine to operate in state 424 as explained below. This speed command may be provided, for example, by pilot controls 402, or by an autopilot system (not shown). When the speed loop is selected, longitudinal acceleration (Ax) stability/speed loop controller 414 determines a pitch attitude command that causes the rotorcraft to maintain a longitudinal speed that corresponds with the speed command.

When a high acceleration condition is sensed and the speed loop is enabled, operation of mode controller 420 transitions from state 424, in which the speed loop is on, to a longitudinal acceleration stability mode in state 426. High acceleration conditions include, for example, an absolute value measured acceleration exceeding a predetermined threshold. This condition may be caused, for example, by a sudden wind gust that accelerates or decelerates the rotor craft, or by the pilot returning the cyclic stick 217 into detent when the rotorcraft is at an unusually high or low pitch attitude. In some embodiments, the predetermined longitudinal acceleration threshold over which mode controller 420 transitions to longitudinal acceleration stability mode in state 426 is 7 ft/sec$^2$; alternatively, other thresholds may be used depending on the particular embodiment and its specifications. Mode controller 420 remains in state 426 corresponding to the longitudinal acceleration stability mode until a low acceleration condition is detected. In an embodiment, the low acceleration condition is detected when the absolute value of the measured longitudinal acceleration (Ax) is less than a second predetermined longitudinal acceleration threshold. In some embodiments, this second predetermined longitudinal acceleration threshold is 2 ft/sec$^2$. Alternatively, other thresholds may be used depending on the particular system and its specifications. Mode controller may transition from state 426 to state 422 in which the speed loop is off upon the speed loop being disabled. In various embodiments, the speed loop may be disabled when the pilot controls 402 are out of detent or when the speed loop is deselected manually or deselected by an autopilot system. This is represented in the state transition diagram as transitions from states 424 and 426 to state 422. In some embodiments, mode controller 420 may transition from speed loop off state 422 to state 426 corresponding to the longitudinal acceleration stability mode when the speed loop is enabled by the manual selection, by the autopilot system or when pilot controls 402 are back in detent. It should be understood that flight controller 404 may monitor longitudinal acceleration when the speed loop is on, when the speed loop is off, when the pilot controls 402 are in detent and when the pilot controls 402 are out of detent.

Figure 6:
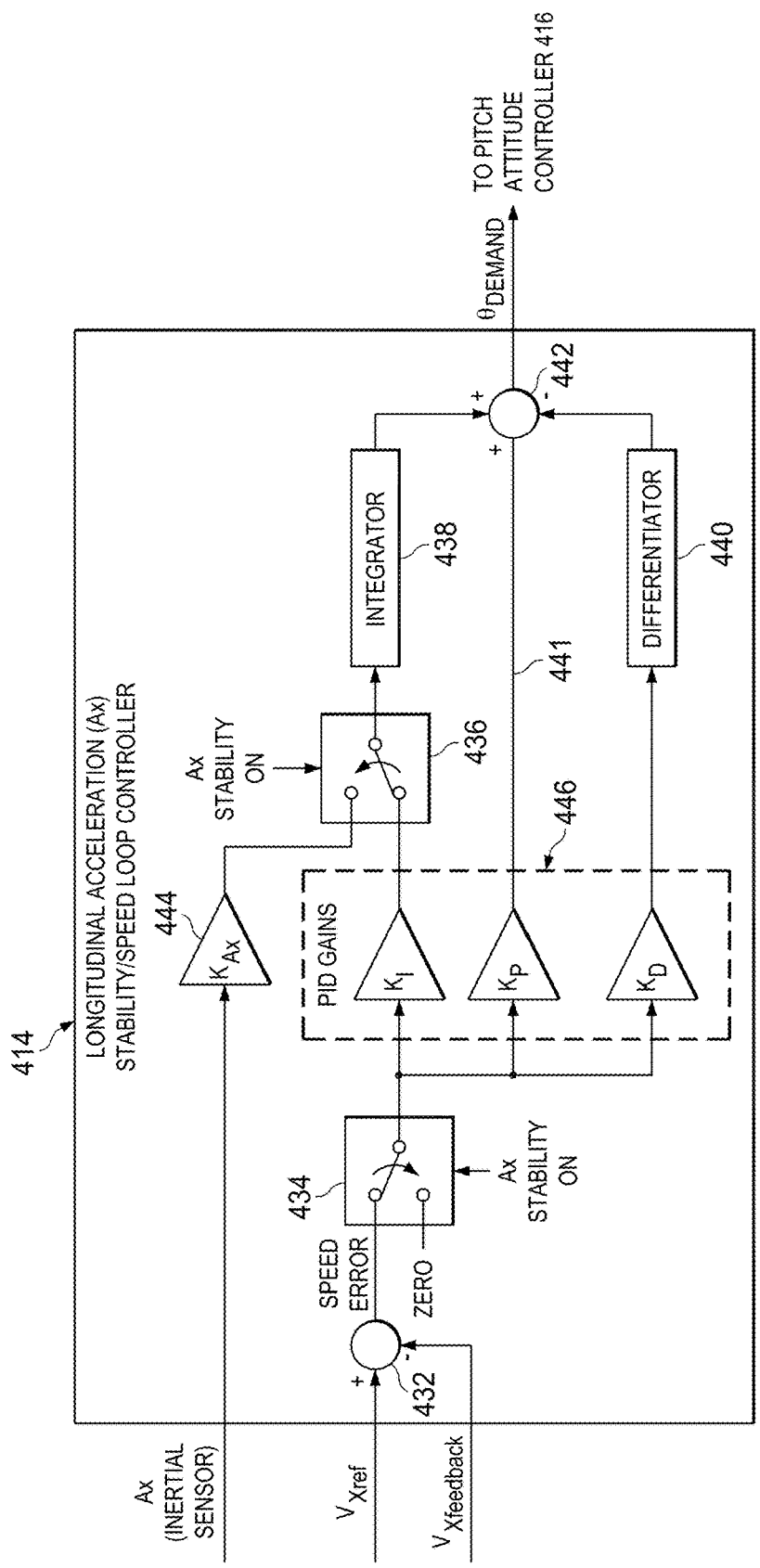
FIG. 6 illustrates a block diagram of an acceleration stability/speed loop controller.

FIG. 6 illustrates a block diagram of longitudinal acceleration (Ax) stability/speed loop controller 414. As shown, longitudinal acceleration (Ax) stability/speed loop controller 414 has a speed control path that includes subtraction block 432 that determines a speed error signal based on a difference between a reference speed $Vx_{REF}$ and a measured speed $Vx_{FEEDBACK}$. The speed control path also has a proportional-integral-differential (PID) controller formed by PID gains 446, integrator 438, proportional path 441, differentiator 440 and summing block 442. During speed control mode, the speed control path is activated by coupling the speed error signal to PID gains 446 via switch 434 and by coupling the output of integrator gain $K_1$ of PID gains 446 to the input of integrator 438 via switch 436. During the speed control mode, the sensed acceleration signal Ax is decoupled from the input of integrator 438 via switch 436. Accordingly, longitudinal acceleration (Ax) stability/speed loop controller 414 determines a pitch attitude signal $\Theta_{DEMAND}$ by determining a difference between reference velocity $Vx_{REF}$ and measured velocity $Vx_{FEEDBACK}$, and providing the determined difference to a PID controller.

Longitudinal acceleration (Ax) stability/speed loop controller 414 also includes an acceleration stability path that includes gain block 444 and integrator 438. When the acceleration stability path is selected by mode controller 420, the input of integrator 438 is coupled to the output of gain block 444 via switch 436 and the inputs to PID gains 446 are set to zero via switch 434.

It should be understood that in embodiments in which longitudinal acceleration (Ax) stability/speed loop controller 414 is implemented by running software on a flight computer the functions of the various blocks shown in FIG. 6 are implemented by software that is executed on a flight computer. For example, subtraction block 432 and summing block 442 may be implemented by performing addition and subtraction, switches 434 and 436 may be implemented by assigning variables, integrator 438 may be implemented by code that performs accumulation and differentiator may be implemented by taking a difference between a present sample and a past sample. PID gains 446 and gain block 444 may be implemented by multiplying values in some embodiments. Alternatively, the functions of longitudinal acceleration (Ax) stability/speed loop controller 414 may be implemented using other types of implementations, for example using hardwired logic, reconfigurable logic or by implementation in the analog domain.

Figure 7:
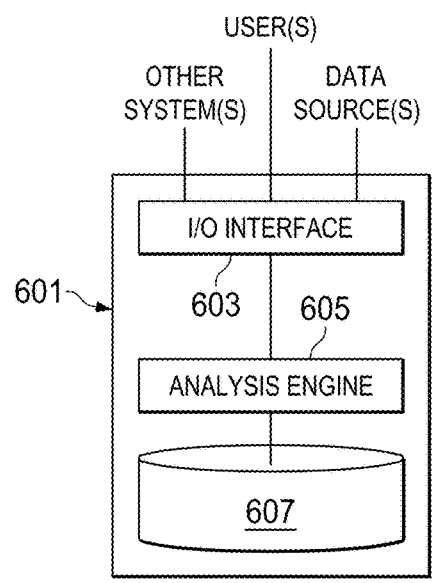
FIG. 7 illustrates a block diagram of a processor that may be used to implement embodiment algorithms.

FIG. 7 illustrates a computer system 601. The computer system 601 can be configured for performing one or more functions with regard to the operation of the flight control system 201, as described herein. Further, any processing and analysis can be partly or fully performed by the computer system 601. The computer system 601 can be partly or fully integrated with other aircraft computer systems or can be partly or fully removed from the rotorcraft.

The computer system 601 can include an input/output (I/O) interface 603, an analysis engine 605, and a database 607. Alternative embodiments can combine or distribute the I/O interface 603, the analysis engine 605, and the database 607, as desired. Embodiments of the computer system 601 may include one or more computers that include one or more processors and memories configured for performing tasks described herein. This can include, for example, a computer having a central processing unit (CPU) and non-volatile memory that stores software instructions for instructing the CPU to perform at least some of the tasks described herein. This can also include, for example, two or more computers that are in communication via a computer network, where one or more of the computers include a CPU and non-volatile memory, and one or more of the computer's non-volatile memory stores software instructions for instructing any of the CPU(s) to perform any of the tasks described herein. Thus, while the exemplary embodiment is described in terms of a discrete machine, it should be appreciated that this description is non-limiting, and that the present description applies equally to numerous other arrangements involving one or more machines performing tasks distributed in any way among the one or more machines. It should also be appreciated that such machines need not be dedicated to performing tasks described herein, but instead can be multi-purpose machines, for example computer workstations, that are suitable for also performing other tasks.

The I/O interface 603 can provide a communication link between external users, systems, and data sources and components of the computer system 601. The I/O interface 603 can be configured for allowing one or more users to input information to the computer system 601 via any known input device. Examples can include a keyboard, mouse, touch screen, and/or any other desired input device. The I/O interface 603 can be configured for allowing one or more users to receive information output from the computer system 601 via any known output device. Examples can include a display monitor, a printer, cockpit display, and/or any other desired output device. The I/O interface 603 can be configured for allowing other systems to communicate with the computer system 601. For example, the I/O interface 603 can allow one or more remote computer(s) to access information, input information, and/or remotely instruct the computer system 601 to perform one or more of the tasks described herein. The I/O interface 603 can be configured for allowing communication with one or more remote data sources. For example, the I/O interface 603 can allow one or more remote data source(s) to access information, input information, and/or remotely instruct the computer system 601 to perform one or more of the tasks described herein.

The database 607 provides persistent data storage for the computer system 601. Although the term "database" is primarily used, a memory or other suitable data storage arrangement may provide the functionality of the database 607. In alternative embodiments, the database 607 can be integral to or separate from the computer system 601 and can operate on one or more computers. The database 607 preferably provides non-volatile data storage for any information suitable to support the operation of the flight control system 201 and the method 500, including various types of data discussed further herein. The analysis engine 605 can include various combinations of one or more processors, memories, and software components.

Embodiments of the present invention are summarized here. Other embodiments can also be understood form the entirety of the specification and the claims filed herein. One general aspect includes a method of operating a rotorcraft that includes operating the rotorcraft in a speed control mode, where a speed of the rotorcraft is proportional to a pilot control command; detecting a high longitudinal acceleration condition; upon detection of the high longitudinal acceleration condition, temporarily disabling the speed control mode and stabilizing the rotorcraft while the speed control mode is disabled; and reestablishing the speed control mode when a measured longitudinal acceleration of the rotorcraft falls below a first threshold.

Implementations may include one or more of the following features. The method where: operating the rotorcraft in the speed control mode includes receiving a target longitudinal speed, receiving a measured longitudinal speed, and determining a pitch actuator command based on the target longitudinal speed and the measured longitudinal speed; and stabilizing the rotorcraft while the speed control mode is disabled includes receiving the measured longitudinal acceleration from an inertial sensor, and determining the pitch actuator command based on the measured longitudinal acceleration; and reestablishing the speed control mode includes reestablishing the speed control mode when an absolute value of the measured longitudinal acceleration falls below the first threshold, which may be, for example, 2 ft/sec$^2$, In some embodiments, the receiving the measured longitudinal speed includes receiving the measured longitudinal speed from an air data sensor. Receiving a target longitudinal speed may include receiving the target longitudinal speed from a pilot control; and detecting the high longitudinal acceleration condition may include receiving an indication that the pilot control is in detent.

In an embodiment, detecting the high longitudinal acceleration condition includes determining that the absolute value of the measured longitudinal acceleration is greater than a second threshold, which may be, for example, 7 ft/sec$^2$. Determining the pitch actuator command may be based on the measured longitudinal acceleration includes integrating the measured longitudinal acceleration. In some embodiments, stabilizing the rotorcraft includes disabling a proportional path and a differentiator path of a speed loop controller.

A further general aspect includes a flight control system for a rotorcraft including a processor and a non-transitory computer readable storage medium with an executable program stored thereon. The executable program includes instructions to: operate the rotorcraft in a first mode including receiving a target longitudinal speed, receiving a measured longitudinal speed, and determining a pitch actuator command based the target longitudinal speed and the measured longitudinal speed using a first control algorithm; and detecting a high longitudinal acceleration condition; transition from operating the rotorcraft in the first mode to operating the rotorcraft in a second mode upon detecting the high longitudinal acceleration condition, where operating the rotorcraft in the second mode includes: receiving a measured longitudinal acceleration from an inertial sensor, and determining the pitch actuator command based on the measured longitudinal acceleration using a second control algorithm; and transition from operating the rotorcraft in the second mode to operating the rotorcraft in the first mode when an absolute value of the measured longitudinal acceleration falls below a first threshold.

Implementations may include one or more of the following features. The flight control system where: the first control algorithm includes determining an error between the target longitudinal speed and the measured longitudinal speed and applying a proportional-integral-derivative controller to the determined error; and the second control algorithm includes integrating the measured longitudinal acceleration. In some embodiments, receiving the target longitudinal speed includes receiving the target longitudinal speed from a pilot control; and detecting the high longitudinal acceleration condition includes receiving an indication that the pilot control is in detent. Detecting the high longitudinal acceleration condition may include, for example, determining that the absolute value of the measured longitudinal acceleration is greater than a second threshold. In one embodiment, the first threshold is 2 ft/sec$^2$; and the second threshold is 7 ft/sec$^2$.

Another general aspect includes a rotorcraft including: a body; a power train coupled to the body and including a power source and a drive shaft coupled to the power source; a rotor system coupled to the power train and including a plurality of rotor blades; a flight control system operable to change at least one operating condition of the rotor system; a pilot control assembly configured to receive commands from a pilot, where the flight control system is a fly-by-wire flight control system in electrical communication with the pilot control assembly; an air data sensor; an inertial sensor; and a flight control computer in electrical communication between the flight control system and the pilot control assembly, the flight control computer configured to: operate the rotorcraft in a speed control mode, where a speed of the rotorcraft is proportional to a pilot control command received from the pilot control assembly; detect a high longitudinal acceleration condition; upon detection of the high longitudinal acceleration condition, temporarily disabling the speed control mode and stabilizing the rotorcraft while the speed control mode is disabled; and reestablish the speed control mode when a longitudinal acceleration measured by the inertial sensor of the rotorcraft falls below a first threshold.

Implementations may include one or more of the following features. The rotorcraft where the flight control computer is further configured to: operate the rotorcraft in the speed control mode by receiving a target longitudinal speed from the pilot control assembly, receiving a measured longitudinal speed from the air data sensor, and determining a pitch actuator command based on the target longitudinal speed and the measured longitudinal speed; and stabilizer the rotorcraft while the speed control mode is disabled includes receiving a measured longitudinal acceleration from the inertial sensor, and determining the pitch actuator command based on the measured longitudinal acceleration; and reestablishing the speed control mode includes reestablishing the speed control mode when an absolute value of the measured longitudinal acceleration falls below the first threshold. The flight control computer may be further configured to detect the high longitudinal acceleration condition when receiving an indication from the pilot control assembly that a pilot control is in detent. In some embodiments, the flight control computer is further configured to detect the high longitudinal acceleration condition when the absolute value of the measured longitudinal acceleration is greater than a second threshold.

In an embodiment the flight control computer is configured to determine the pitch actuator command based on the measured longitudinal acceleration by integrating the measured longitudinal acceleration. The flight control computer may also be configured to stabilize the rotorcraft by disabling a proportional path and a differentiator path of a speed loop controller. In some embodiments, the flight control computer is configured to transmit a pitch actuator command to a swashplate of the rotor system.

Advantages of embodiments include the ability to maintain control of a rotorcraft during sudden changes in acceleration or following large pitch attitude pilot commands in addition to providing accurate speed control.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of operating a rotorcraft, the method comprising:
   operating the rotorcraft in a speed control mode, wherein a speed of the rotorcraft is proportional to a pilot control command and operating the rotorcraft in the speed control mode comprises
   receiving a target longitudinal speed,
   receiving a measured longitudinal speed,
   determining a pitch actuator command based on the target longitudinal speed and the measured longitudinal speed, and
   transmitting the pitch actuator command to an actuator of the rotorcraft;
   detecting a high longitudinal acceleration condition;

upon detection of the high longitudinal acceleration condition, temporarily disabling the speed control mode and stabilizing the rotorcraft while the speed control mode is disabled, wherein stabilizing the rotorcraft while the speed control mode is disabled comprises
receiving a measured longitudinal acceleration from an inertial sensor, and
determining the pitch actuator command based on the measured longitudinal acceleration; and
reestablishing the speed control mode when an absolute value of a measured longitudinal acceleration of the rotorcraft falls below a first threshold.

2. The method of claim 1, wherein receiving the measured longitudinal speed comprises receiving the measured longitudinal speed from an air data sensor.

3. The method of claim 1, wherein:
receiving a target longitudinal speed comprises receiving the target longitudinal speed from a pilot control; and
detecting the high longitudinal acceleration condition comprises receiving an indication that the pilot control is in detent.

4. The method of claim 1, wherein detecting the high longitudinal acceleration condition comprises determining that the absolute value of the measured longitudinal acceleration is greater than a second threshold.

5. The method of claim 4, wherein the second threshold is 7 ft/sec$^2$.

6. The method of claim 1, wherein determining the pitch actuator command based on the measured longitudinal acceleration comprises integrating the measured longitudinal acceleration.

7. The method of claim 1, wherein stabilizing the rotorcraft comprises disabling a proportional path and a differentiator path of a speed loop controller.

8. The method of claim 1, wherein the first threshold is 2 ft/sec$^2$.

9. A flight control system for a rotorcraft comprising a processor and a non-transitory computer readable storage medium with an executable program stored thereon, the executable program including instructions to:
operate the rotorcraft in a first mode comprising
receiving a target longitudinal speed,
receiving a measured longitudinal speed, and
determining a pitch actuator command based the target longitudinal speed and the measured longitudinal speed using a first control algorithm; and
detecting a high longitudinal acceleration condition;
transition from operating the rotorcraft in the first mode to operating the rotorcraft in a second mode upon detecting the high longitudinal acceleration condition, wherein operating the rotorcraft in the second mode comprises:
receiving a measured longitudinal acceleration from an inertial sensor, and
determining the pitch actuator command based on the measured longitudinal acceleration using a second control algorithm; and
transition from operating the rotorcraft in the second mode to operating the rotorcraft in the first mode when an absolute value of the measured longitudinal acceleration falls below a first threshold.

10. The flight control system of claim 9, wherein:
the first control algorithm comprises determining an error between the target longitudinal speed and the measured longitudinal speed and applying a proportional-integral-derivative controller to the determined error; and
the second control algorithm comprises integrating the measured longitudinal acceleration.

11. The flight control system of claim 9, wherein:
receiving the target longitudinal speed comprises receiving the target longitudinal speed from a pilot control; and
detecting the high longitudinal acceleration condition comprises receiving an indication that the pilot control is in detent.

12. The flight control system of claim 9, wherein detecting the high longitudinal acceleration condition comprises determining that the absolute value of the measured longitudinal acceleration is greater than a second threshold.

13. The flight control system of claim 12, wherein:
the first threshold is 2 ft/sec$^2$; and
the second threshold is 7 ft/sec$^2$.

14. A rotorcraft comprising:
a body;
a power train coupled to the body and comprising a power source and a drive shaft coupled to the power source;
a rotor system coupled to the power train and comprising a plurality of rotor blades;
a flight control system operable to change at least one operating condition of the rotor system;
a pilot control assembly configured to receive commands from a pilot, wherein the flight control system is a fly-by-wire flight control system in electrical communication with the pilot control assembly;
an air data sensor;
an inertial sensor; and
a flight control computer in electrical communication between the flight control system and the pilot control assembly, the flight control computer configured to:
operate the rotorcraft in a speed control mode by
receiving a target longitudinal speed from the pilot control assembly,
receiving a measured longitudinal speed from the air data sensor, and
determining a pitch actuator command based on the target longitudinal speed and the measured longitudinal speed, wherein a speed of the rotorcraft is proportional to a pilot control command received from the pilot control assembly;
detect a high longitudinal acceleration condition;
upon detection of the high longitudinal acceleration condition, temporarily disable the speed control mode and stabilizing the rotorcraft while the speed control mode is disabled by
receiving a measured longitudinal acceleration from the inertial sensor, and
determining the pitch actuator command based on the measured longitudinal acceleration; and
reestablish the speed control mode when an absolute value of a longitudinal acceleration measured by the inertial sensor of the rotorcraft falls below a first threshold.

15. The rotorcraft of claim 14, wherein the flight control computer is further configured to detect the high longitudinal acceleration condition when receiving an indication from the pilot control assembly that a pilot control is in detent.

16. The rotorcraft of claim 14, wherein the flight control computer is further configured to detect the high longitudinal acceleration condition when the absolute value of the measured longitudinal acceleration is greater than a second threshold.

17. The rotorcraft of claim 14, wherein the flight control computer is further configured to determine the pitch actuator command based on the measured longitudinal acceleration by integrating the measured longitudinal acceleration.

18. The rotorcraft of claim 14, wherein the flight control computer is further configured to transmit the pitch actuator command to a swashplate of the rotor system.

19. The rotorcraft of claim 14, wherein the flight control computer is further configured to stabilize the rotorcraft by disabling a proportional path and a differentiator path of a speed loop controller.

* * * * *